(12) United States Patent
Hudson et al.

(10) Patent No.: US 10,263,689 B2
(45) Date of Patent: Apr. 16, 2019

(54) TRANSMISSION POWER CONTROL BASED ON POSITION OF MOVING PLATFORM AND PREVAILING EMISSION RESTRICTIONS

(71) Applicant: BAE SYSTEMS PLC, London (GB)

(72) Inventors: Peter Noble Hudson, Preston (GB); Rania Hamdi Eissa, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/747,782

(22) PCT Filed: Aug. 2, 2016

(86) PCT No.: PCT/GB2016/052371
§ 371 (c)(1),
(2) Date: Jan. 26, 2018

(87) PCT Pub. No.: WO2017/025713
PCT Pub. Date: Feb. 16, 2017

(65) Prior Publication Data
US 2018/0212672 A1    Jul. 26, 2018

(30) Foreign Application Priority Data

Aug. 13, 2015  (GB) .................................. 1514451.2
Sep. 2, 2015   (EP) .................................. 15183514

(51) Int. Cl.
*H04B 7/185* (2006.01)
*H04W 52/28* (2009.01)

(52) U.S. Cl.
CPC ......... *H04B 7/18506* (2013.01); *H04B 7/185* (2013.01); *H04W 52/285* (2013.01)

(58) Field of Classification Search
CPC ............ H04B 7/18506; H04B 7/18508; H04B 7/0608; H04B 1/1638; H04B 1/3822;
(Continued)

(56) References Cited

U.S. PATENT DOCUMENTS 2,062,003 A   11/1936  Hammond, Jr.
4,100,472 A    7/1978  Mobley
(Continued)

FOREIGN PATENT DOCUMENTS

EP   0481171 A2   4/1992
EP   0532383 A1   3/1993
(Continued)

OTHER PUBLICATIONS

International Preliminary Report on Patentability of International Application No. PCT/GB2016/052371, dated Feb. 22, 2018, 10 pages.
(Continued)

*Primary Examiner* — Philip Sobutka
(74) *Attorney, Agent, or Firm* — Maine Cernota & Rardin

(57) ABSTRACT

Apparatus for communications management in respect of a moving platform having a dynamic planner (40) configured to generate a communications plan utilising one or more of a plurality of communications planning strategies, at least one platform application (14, 16, 18, 20, FIG. 1), and a communications system (42) configured to effect wireless data communication of data received from a platform application by means of one or more supported communications links in accordance with said communications plan, wherein said apparatus comprises an interface function between said dynamic planner (40) and said communications system (42), said interface function including a communications executive module (141) and a communications management module (41), said communications executive module (141) being configured to receive, from said communications system (42), condition data representative of a prevailing situational and/or environmental condition affecting a current communications plan during mission execution, generate re-plan request data and transmit said re-plan request data to said
(Continued)

communications management module (41); said communications management module (41) being configured to generate plan request data in response to said re-plan request data and transmit said plan request data to said dynamic planner (40), said plan request data being configured to cause said dynamic planner (40) to generate a revised communications plan and transmit said revised communications plan to said communications system (42), wherein said plan request data is generated by said communications management module (41) by selecting a strategy from said plurality of communications planning strategies, based at least on said condition data, and generating said plan request data including data representative of said selected strategy.

14 Claims, 7 Drawing Sheets

(58) Field of Classification Search
CPC .. H04B 1/3838; H04B 7/0695; H04B 7/0802; H04B 7/088; H04B 7/15528; H04B 7/18504
USPC ............ 455/456.1, 522, 431, 11.1, 41.2, 411
See application file for complete search history.

(56) References Cited

U.S. PATENT DOCUMENTS

| | | | |
|---|---|---|---|
| 6,115,580 | A | 9/2000 | Chuprun et al. |
| 7,072,977 | B1 | 7/2006 | Bernard et al. |
| 8,554,264 | B1 | 10/2013 | Gibbons et al. |
| 2002/0142773 | A1 | 10/2002 | Rudrapatna et al. |
| 2002/0164981 | A1 | 11/2002 | Parkman |
| 2003/0073406 | A1 | 4/2003 | Benjamin |
| 2005/0202827 | A1 | 9/2005 | DeMarco et al. |
| 2006/0030350 | A1* | 2/2006 | Mitchell ............ H04W 52/146 455/522 |
| 2006/0168592 | A1 | 7/2006 | Andrews et al. |
| 2007/0064604 | A1 | 3/2007 | Chen |
| 2007/0168090 | A1 | 7/2007 | DeMarco et al. |
| 2007/0258445 | A1 | 11/2007 | Smith |
| 2007/0258486 | A1 | 11/2007 | Smith |
| 2007/0291647 | A1 | 12/2007 | Smith |
| 2007/0291767 | A1 | 12/2007 | Smith |
| 2007/0291768 | A1 | 12/2007 | Galliscio |
| 2007/0291780 | A1 | 12/2007 | Smith |
| 2007/0297416 | A1 | 12/2007 | Boley |
| 2008/0204279 | A1 | 8/2008 | Bourgault |
| 2009/0079631 | A1 | 3/2009 | Hurst |
| 2009/0185617 | A1 | 7/2009 | Houghton et al. |
| 2009/0326735 | A1 | 12/2009 | Wood |
| 2010/0057278 | A1 | 3/2010 | Lee |
| 2010/0094485 | A1 | 4/2010 | Verlut et al. |
| 2010/0323715 | A1 | 12/2010 | Winters |
| 2011/0255506 | A1 | 10/2011 | Toth |
| 2012/0078453 | A1 | 3/2012 | Daum et al. |
| 2012/0257657 | A1 | 10/2012 | Subrahmanya et al. |
| 2012/0268319 | A1 | 10/2012 | Mitchell |
| 2013/0041529 | A1 | 2/2013 | He |
| 2013/0095822 | A1 | 4/2013 | Swardh |
| 2013/0324070 | A1 | 12/2013 | Bennett et al. |
| 2014/0014787 | A1 | 1/2014 | Chen |
| 2014/0075506 | A1 | 3/2014 | Davis |
| 2014/0142787 | A1 | 5/2014 | Tillotson |
| 2014/0218239 | A1 | 8/2014 | Sharawi et al. |
| 2014/0226584 | A1 | 8/2014 | Cullen et al. |
| 2014/0274180 | A1* | 9/2014 | DuBois ................ H04W 72/04 455/509 |
| 2014/0323038 | A1 | 10/2014 | Hubbell et al. |
| 2015/0102953 | A1 | 4/2015 | Stayton |
| 2015/0120087 | A1 | 4/2015 | Duan |
| 2015/0210387 | A1 | 7/2015 | Ling |
| 2015/0229376 | A1 | 8/2015 | Kikuchi |
| 2017/0034277 | A1 | 2/2017 | Jackson |
| 2017/0283038 | A1 | 10/2017 | Lin |

FOREIGN PATENT DOCUMENTS

| | | |
|---|---|---|
| EP | 1519507 A2 | 3/2005 |
| EP | 1630978 A2 | 3/2006 |
| EP | 2228868 A1 | 9/2010 |
| EP | 2378676 A1 | 10/2011 |
| EP | 2450862 A1 | 5/2012 |
| EP | 2469291 A1 | 6/2012 |
| EP | 2779480 A2 | 9/2014 |
| EP | 2822187 A1 | 1/2015 |
| EP | 2869479 A1 | 5/2015 |
| EP | 2933931 A2 | 10/2015 |
| GB | 2493779 A | 2/2013 |
| JP | 2001153596 A | 6/2001 |
| JP | 2010171496 A | 8/2010 |
| TW | 201321916 A | 6/2013 |
| WO | 2006130272 A2 | 12/2006 |
| WO | 2007021411 A2 | 2/2007 |
| WO | 2007110607 A1 | 10/2007 |
| WO | 2010147986 A1 | 12/2010 |
| WO | 2011075869 A1 | 6/2011 |
| WO | 2012145570 A1 | 10/2012 |
| WO | 2015117284 A1 | 8/2015 |

OTHER PUBLICATIONS

International Preliminary Report on Patentability of International Application No. PCT/GB2016/052374, dated Feb. 22, 2018, 8 pages.
International Preliminary Report on Patentability of International Application No. PCT/GB2016/052484, dated Feb. 22, 2018, 7 pages.
International Preliminary Report on Patentability of International Application No. PCT/GB2016/052480, dated Feb. 22, 2018, 8 pages.
International Preliminary Report on Patentability of International Application No. PCT/GB2016/052481, dated Feb. 22, 2018, 8 pages.
International Preliminary Report on Patentability of International Application No. PCT/GB2016/052401, dated Feb. 22, 2018, 8 pages.
International Preliminary Report on Patentability of International Application No. PCT/GB2016/052400, dated Feb. 22, 2018, 7 pages.
International Preliminary Report on Patentability of International Application No. PCT/GB2016/052378, dated Feb. 22, 2018, 7 pages.
International Preliminary Report on Patentability of International Application No. PCT/GB2016/052483, dated Feb. 22, 2018, 9 pages.
International Preliminary Report on Patentability of International Application No. PCT/GB2016/052379, dated Feb. 22, 2018, 7 pages.
International Search Report and Written Opinion of International Application No. PCT/GB2016/052371, dated Oct. 26, 2016, 14 pages.
Great Britain Search Report under Section 17 of Great Britain Application No. GB1514451.2, dated Feb. 15, 2016, 3 pages.
Extended European Search Report of European Application No. EP15183514, dated Mar. 2, 2016, 10 pages.
International Search Report and Written Opinion of International Application No. PCT/GB2016/052374, dated Oct. 13, 2016, 12 pages.
Great Britain Search Report under Section 17 of Great Britain Application No. GB1514452, dated Jan. 26, 2016, 4 pages.
Extended European Search Report of European Application No. EP15183519, dated Mar. 3, 2016, 8 pages.
International Search Report and Written Opinion of International Application No. PCT/GB2016/052378 dated Oct. 24, 2016, 11 pages.

(56) References Cited

OTHER PUBLICATIONS

Great Britain Search Report under Section 17 of Great Britain Application No. GB1514454.6, dated Jan. 28, 2016, 3 pages.
European Search Report of European Application No. EP15183517, dated Mar. 1, 2016, 8 pages.
International Search Report and Written Opinion of International Application No. PCT/GB2016/052379, dated Oct. 18, 2016, 10 pages.
Great Britain Search Report under Section 17 of Great Britain Application No. GB1514455.3, dated Mar. 18, 2016, 4 pages.
European Search Report of European Application No. EP15183723, dated Mar. 3, 2016, 6 pages.
International Search Report and Written Opinion of International Application No. PCT/GB2016/052400, dated Oct. 18, 2016, 12 pages.
Great Britain Search Report under Section 17 of Great Britain Application No. GB1514457.9, dated Mar. 18, 2016, 3 page.
European Search Report of European Application No. EP15183720, dated Mar. 4, 2016, 8 pages.
Chen-Mou Cheng et al: "Transmit Antenna Selection Based on Link-layer Channel Probing", World of Wireless, Mobile and Multimedia Networks, 2007. WOWMUM 2007. IEEE International Symposium on A, IEEE, PI, Jun. 1, 2001, pp. 1-6 XP031149144.
International Search Report and Written Opinion of International Application No. PCT/GB2016/052401, dated Oct. 14, 2016, 12 pages.
Great Britain Search Report under Section 17 of Great Britain Application No. GB1514459.5, dated Jan. 28, 2016, 4 pages.
European Search Report of European Application No. EP15183731, dated Mar. 9, 2016, 8 pages.
International Search Report and Written Opinion of International Application No. PCT/GB2016/052481, dated Nov. 2, 2016, 12 pages.
Great Britain Search Report under Section 17 of Great Britain Application No. GB1514460.3, dated Jan. 27, 2016, 3 pages.
Great Britain Search Report under Section 17 of Great Britain Application No. GB1613746.5, dated Jan. 30, 2017, 5 pages.
European Search Report of European Application No. EP15184038, dated Mar. 2, 2016, 9 pages.
International Search Report and Written Opinion of International Application No. PCT/GB2016/052483, dated Oct. 28, 2016, 13 pages.
Great Britain Search Report under Section 17 of Great Britain Application No. GB1514461.1, dated Jan. 29, 2016, 3 pages.
Great Britain Search Report under Section 17 of Great Britain Application No. GB1613747.3, dated Jan. 6, 2017, 5 pages.
European Search Report of European Application No. EP15184043, dated Mar. 7, 2016, 10 pages.
International Search Report and Written Opinion of International Application No. PCT/GB2016/052480, dated Oct. 28, 2016, 12 pages.
Great Britain Search Report under Section 17 of Great Britain Application No. GB1514462.9, dated Mar. 18, 2016, 3 pages.
European Search Report of European Application No. EP15184044, dated Mar. 10, 2016, 8 pages.
International Search Report and Written Opinion of International Application No. PCT/GB2016/052484, dated Oct. 18, 2016, 12 pages.
Great Britain Search Report under Section 17 of Great Britain Application No. GB1514465.2, dated Mar. 17, 2016, 3 pages.
European Search Report of European Application No. EP15184074, dated Mar. 4, 2016, 8 pages.

* cited by examiner

TRANSMISSION POWER CONTROL BASED ON POSITION OF MOVING PLATFORM AND PREVAILING EMISSION RESTRICTIONS

RELATED APPLICATIONS

This application is a national phase application filed under 35 USC § 371 of PCT Application No. PCT/GB2016/052371 with an International filing date of Aug. 2, 2016 which claims priority of GB Patent Application 1514451.2 filed Aug. 13, 2015 and EP Patent Application 15183514.7 filed Sep. 2, 2015. Each of these applications is herein incorporated by reference in its entirety for all purposes.

This invention relates generally to an apparatus and method for communications and information management and, more particularly, but not necessarily exclusively, to an apparatus and method for management of wireless communications resources between a moving platform and at least one target.

There are many applications in which it is required to apply a level of management in respect of wireless communications and the management of information, particularly between a moving platform and a remote target, and maintain adequate wireless communications therebetween for safe operation of the moving platform and mission success.

For example, in the case of aerial vehicles and, more particularly, unmanned aerial vehicles (UAVs), there is an ongoing and stringent requirement to maintain an adequate communication link between the aerial vehicle and a ground station, for example, and unexpected loss or degradation of such a communications link can be catastrophic.

A UAS is composed of three main parts, the unmanned air vehicle (UAV), unmanned control station (UCS) and support systems of the UAS (for pre-mission planning). A UAS Mission System may be composed of the following functional components/subsystems: Mission Management, Communications, Vehicle Health, Navigation System, Airspace Integration, Payload and Power Management. Multiple, different dynamic in-mission planners may reside in one or more of the above-mentioned functional components/subsystems. In a typical UAV, a dynamic route planner generates a new route, in real time, when there is a change in the operational environment, e.g. severe weather, pop-up threat, or a change of circumstances, e.g. an emergency, or a dynamic manoeuvre plan is generated to avoid an airborne obstacle. The aim is thus to maintain safety and the survivability of the aircraft by determining a feasible route and/or manoeuvre in real time, while avoiding pop-up, static and dynamic obstacles, for example.

However, the operational environment of moving platforms, at least in some applications, can be particularly challenging from a communications perspective, and it would be desirable to provide an intelligent communications management system that is able to adapt and respond in real time (or substantially real time) to unplanned events, such as link degradation or failure, new operational or environmental constraints, modified orders or changes in mission priorities, in order to meet pre-planned mission objectives during mission execution.

For example, a pilot (at a ground station) and an unmanned air vehicle may be communicating via SATCOM, when the on-board system detects an intruder and manoeuvres to avoid it. In doing so, the air vehicle cuts off its link to the satellite and the communications link between the air vehicle and the pilot is lost. As a result, the pilot no longer has situational awareness of conditions relating to the UAV and its environment. Ideally, it is desired that communications between the UAV and the pilot is maintained regardless of the manoeuvre/orientation of the aircraft or any other unplanned event. In another example, dynamic emissions control (EMCON) is imposed; however, the UAV's antenna used for transmitting messages may be oriented in an unfavourable direction relative to an imposed EMCON region or with respect to an adversary. Also, the energy radiated in that direction may exceed an acceptable threshold for emissions control, increasing the vulnerability of the UAV and possibly betraying its existence. To avoid these issues, traditionally a platform is required to operate in silence. However, having an adaptable and responsive communications system, it may be possible to maintain communications during mission execution, without potentially betraying its existence. In particular, therefore, it would be desirable to provide an intelligent communications management system that can adapt and respond dynamically (in real or substantially real time) to unplanned events, that can only be assessed in real time, thereby making communications resilient to unplanned events, whilst meeting mission objectives.

GB2493779 describes a system in which a communications plan can be updated (at a low level) in response to situational awareness data, wherein such an update comprises selecting a new channel frequency. Other prior art documents describe systems in which a new communications system may be selected to maintain a required line of communication.

It is, therefore, an object of at least some aspects of the present invention to address at least one or more of these issues and, in accordance with a first aspect of the invention, there is provided apparatus for communications management in respect of a moving platform having a dynamic planner configured to generate a communications plan utilising one or more of a plurality of communications planning strategies, at least one platform application, and a communications system configured to effect wireless data communication of data received from a platform application by means of one or more supported communications links in accordance with said communications plan, wherein said apparatus comprises an interface function between said dynamic planner and said communications system, said interface function including a communications executive module and a communications management module, said communications executive module being configured to receive, from said communications system, condition data representative of a prevailing situational and/or environmental condition affecting a current communications plan during mission execution, generate re-plan request data and transmit said re-plan request data to said communications management module; said communications management module being configured to generate plan request data in response to said re-plan request data and transmit said plan request data to said dynamic planner, said plan request data being configured to cause said dynamic planner to generate a revised communications plan and transmit said revised communications plan to said communications system, wherein said plan request data is generated by said communications management module by selecting a strategy from said plurality of communications planning strategies, based at least on said condition data, and generating said plan request data including data representative of said selected strategy.

The above-mentioned communications planning strategies may include two or more of platform manoeuvre, antenna and/or link selection, power transmission selection and/or antenna beam selection.

In an exemplary embodiment, the communications management module may be configured to include, in said plan request data, said condition data, or data representative thereof, for use by said dynamic planner in generating said revised communications plan. The condition data may include data representative of a platform manoeuvre that may affect a current or future communications link, and wherein said apparatus is configured to transmit said condition data, or data representative thereof, to said dynamic planner for use thereby in generating said revised communications plan.

The communications management module may be configured to transmit said plan request data to an authorisation module for assessment and, in response to a positive assessment of said plan request data, the communications management module is configured to transmit a re-plan request to said dynamic planner.

Optionally, the condition data may comprise data representative of a change of emissions control conditions in respect of said moving platform and/or an adversary node, and wherein said communications management module is configured to transmit said condition data to said dynamic planner for use thereby in generating a revised communications plan.

The condition data may comprise data representative of detected interference and/or jamming in respect of a communications link for said moving platform, the communications management module being configured to transmit said condition data to said dynamic planner for use thereby in generating a revised communications plan.

The condition data may comprise data indicative that a current wireless communications link has failed or a quality of a communications link has changed, wherein said communications management module is configured, in response thereto, to generate said plan request data, the apparatus being further configured to transmit said plan request data to said dynamic planner to cause said dynamic planner to generate a revised communications plan.

The condition data may comprise data representative of a current operational mode of said moving platform.

In an exemplary embodiment, the dynamic planner may be configured to transmit said revised communications plan to said communications management module, and said communications management module is configured to transmit said revised communications plan, or data representative thereof, to said communications system.

In accordance with another aspect of the present invention, there is provided a management system for a moving platform comprising at least one platform application, the management system comprising a dynamic planner configured to generate a communications plan incorporating one or more of a plurality of communications planning strategies, a communications system configured to effect wireless data communication of data received from a platform application by means of one or more supported communications links in accordance with said communications plan, and an interface function between said dynamic planner and said communications system, said interface function including a communications executive module and a communications management module, said communications executive module being configured to receive, from said communications system, condition data representative of a prevailing situational and/or environmental condition affecting a current communications plan during mission execution, generate re-plan request data and transmit said re-plan request data to said communications management module; said communications management module being configured to generate plan request data in response to said re-plan request data and transmit said plan request data to said dynamic planner, said plan request data being configured to cause said dynamic planner to generate a revised communications plan and transmit said revised communications plan to said communications system, wherein said plan request data is generated by said communications management module by selecting a strategy from said plurality of communications planning strategies, based at least on said condition data, and generating said plan request data including data representative of said selected strategy.

In an exemplary embodiment, the communications executive module may be configured to receive further condition data from other systems and/or functions of said moving platform and transmit said further condition data to said dynamic planner in generating said revised communications plan.

The communications planning strategies may include a revised route plan and/or obstacle avoidance/manoeuvre plan.

The communications planning strategies may include an antenna, link and/or off-board transmission power plan, designed to maintain optimal communications in respect of said one or more communications links.

In accordance with yet another aspect of the present invention, there is provided a method for communications management in respect of a moving platform having a dynamic planner configured to generate a communications plan incorporating one or more of a plurality of communications strategies, at least one platform application, and a communications system configured to effect wireless data communication of data received from a platform application by means of one or more supported communications links in accordance with said communications plan, wherein said method comprises configuring and employing an interface function between said dynamic planner and said communications system, said interface function including a communications executive module and a communications management module, said communications executive module being configured to receive, from said communications system, condition data representative of a prevailing situational and/or environmental condition affecting a current communications plan during mission execution, generate re-plan request data and transmit said re-plan request data to said communications management module; said communications management module being configured to generate plan request data in response to said re-plan request data and transmit said plan request data to said dynamic planner, said plan request data being configured to cause said dynamic planner to generate a revised communications plan and transmit said revised communications plan to said communications system, wherein said plan request data is generated by said communications management module by selecting a strategy from said plurality of communications planning strategies, based at least on said condition data, and generating said plan request data including data representative of said selected strategy.

Thus, the present invention, in contrast to the prior art, provides an interface function whereby the dynamic planner can be re-utilised dynamically during a mission, in response to situational/environmental conditions adversely affecting a current communications plan, to generate a revised communications plan, using the same communications planning strategies available to it during the pre-mission communications planning, namely (in an exemplary embodiment) two or more of platform/node manoeuvre, antenna and/or link selection, transmission power selection and/or antenna beam selection, whilst maintaining adherence with any current EMCON restrictions, where applicable.

These and other aspects of the present invention will be apparent from the following specific description in which embodiments of the present invention are described, by way of examples only, and with reference to the accompanying drawings, in which.

Figure 1:
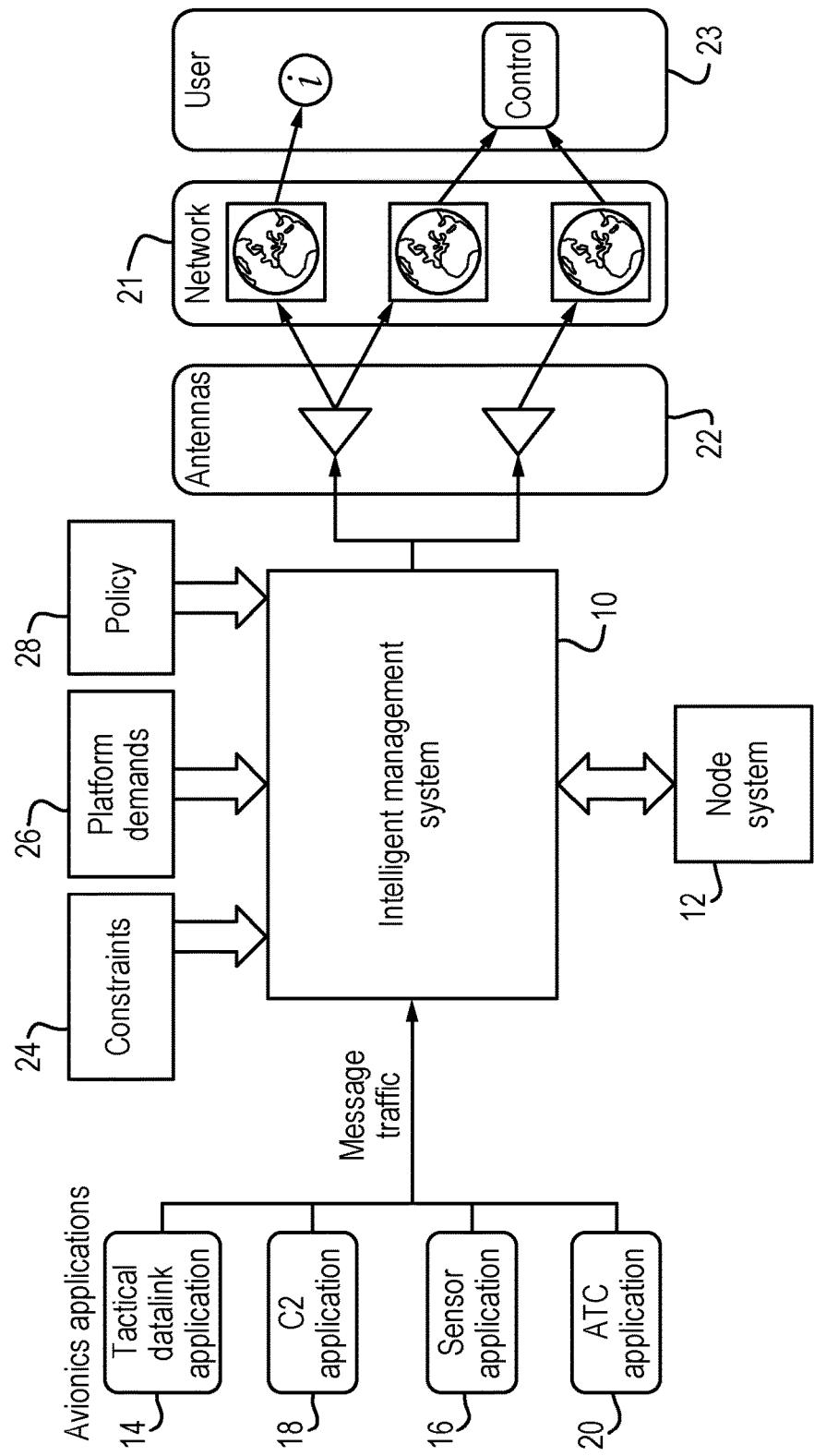
FIG. 1 is a schematic block diagram illustrating a moving platform system, including apparatus according to an exemplary embodiment of the present invention.

Exemplary embodiments of the present invention provide an intelligent communications management system in which data representative of situational and/or environmental conditions can be used to enable the system to adapt and respond dynamically (in real or substantially real time) to unplanned events, that can only be assessed in real time, thereby making communications resilient to unplanned events, whilst meeting mission objectives.

Traditionally, all aspects of communications, such as multiple, different communications links/radios, reside within the communications system. Each of the communications links/radios is an independent system and usually dedicated to transmitting specific messages. If, for example, the resource on one of the links becomes over-subscribed and/or constrained, the system is unable to dynamically reallocate and use other available, suitable links. In another example, if an unexpected event occurs, such as a link failure, a change in mission priorities and a pop-up threat, the system is unable to adapt and respond accordingly to maintain adequate communications. The communications system is usually a dedicated system without much interaction, if not all, with other platform systems and avionics applications on the platform. If for example, the bandwidth on a communications link is constrained, the transmitting applications continues to transmit its data for off-board transmission, unaware of the performance of the network. As a result, the transmitting application's data may not reach its destination in a timely manner, or a transmitting application may overwhelm the off-board network router (e.g. buffers), leading to the loss of critical data. Bandwidth is a critical resource and avionics applications would need to react to the changes, making efficient use of the available bandwidth. In contrast, in aspects of the present invention, it is recognised that all systems/subsystems on a platform (e.g. mission management, health management, airspace integration, communications) work in concert to achieve objectives and to maintain integrity of the platform. For example, the communications system may inform the platform health management system when a lost link situation arises to ensure that communications failure will not lead to a catastrophe. In another example, the communications system works in concert with avionics applications, enabling them to make efficient use of the available bandwidth. Thus, and as will be described in more detail later, the communications system is concerned with low-level decision making, i.e. day-to-day running and decisions. For example, it manages the available communications links, including antennas, and routes messages along the most appropriate link, as well as interfacing (indirectly) with avionics applications, enabling them to make efficient use of the available resources. In the prior art, the dynamic planning function generates an initial communications plan (pre-mission) for use by the communications system which, in turn, undertakes the above-described low level communications planning in accordance with the communications plan. However, if it is unable to resolve any communications issues at this low level, during a mission, then communications may be compromised, potentially catastrophically. In contrast, in aspects of the present invention, if the communications system is unable to resolve any communications issues, for example, all available communications links to it have failed or severely degraded links, then higher-level planning can be (re-)invoked via apparatus according to exemplary embodiments of the present invention. In this case, the communications interface is configured to request that the dynamic planning and management system (which may reside in mission management) generate a modified plan in order to meet platform demands, thereby enabling all of the communications planning strategies available to the dynamic planner (pre-mission) to be utilised during a mission to resolve communications issues arising from instant situational/environmental conditions.

Thus, in one embodiment, it is envisaged that the aircraft's future flight trajectory and/or manoeuvre is provided to the dynamic planning and management system to assess the impact of the trajectory plan on the communications plan and select appropriate resources to use, such as communications links and antennas, to maintain adequate communications. In another embodiment, it is envisaged that the communications system uses instant knowledge regarding the aircraft's current manoeuvre (e.g. heading or banking), or indeed current knowledge of any other situational/environmental condition affecting a current communication route, to cause the communications interface to transmit a re-plan request to the dynamic planning and management module, in order to restore adequate communications.

The operational environment of a moving platform, in many different applications, comprises a plurality of nodes (e.g. fixed/mobile control station, manned and/or unmanned air vehicles) interacting with each other via different networks, exchanging, for example, Command and Control (C2), maintaining situational/environmental awareness, and cooperatively working together. In general, a node has multiple data links/radios to enable it to interact with other nodes via different networks, as required.

In the following description of the drawings, a communications management apparatus according to an exemplary embodiment of the invention will be described in relation to a UAV system. However, it is to be understood that the present invention is not necessarily intended to be limited in this regard and, indeed, finds application in many other types of mobile vehicle and fixed infrastructure systems in which it is required to manage communications in an intelligent manner and, for the avoidance of doubt, this would include manned and unmanned road and sea-going vehicles, ground- and airborne-control based infrastructure, as well as manned aerial vehicles.

Referring to FIG. 1 of the drawings, an intelligent management module 10, including apparatus according to an exemplary embodiment of an aspect of the present invention, is illustrated schematically at the centre of a typical UAV. The UAV comprises a plurality of functions, including communications, navigation system, prognostics and health, etc. Thus, in the schematic diagram of FIG. 1, the intelligent communications management module 10 is incorporated in a first node and depicted as being communicably coupled to other parts 12 of the vehicle. It can be seen from the diagram that two-way data communication is provided between the rest of the vehicle 12 and the intelligent management module 10. The node system 12 may comprise a plurality of functional components/systems/subsystems, possibly including, but not necessarily limited to, a prognostics and health functional component, a navigation system, a control authority, e.g. pilot or an on-board authority with executive decision functionality, a utilities management functional component, defensive aids functional component, data transfer and recording functional component, and an HMI (Human Machine Interface) functional component. Any and all of these functional components are configured to provide information, such as navigation data and detected threat, to the intelligent communications management module 10 for use in its decision making.

The intelligent communications management module 10 is also configured to receive data from a plurality of avionics applications. Such avionics applications may, for example, comprise civil and/or military applications, such as tactical datalink applications 14, sensor applications 16 (e.g. video, images), mission management applications 18 (for example, command and control data), and platform management applications 20 (e.g. health of node). It will be appreciated that this is not a comprehensive list of typical or possible applications from which the intelligent communications management system may receive data and others will be apparent to a person skilled in the art, depending upon the specific application within which the present invention is to be employed.

The intelligent communications management module 10 is configured to manage multiple communications links (generally depicted in FIG. 1 as 'network' 21), which may include (but are not limited to) tactical data links, satellite links, free space optical links and other data links, as will be apparent to a person skilled in the art, and it may have different antenna types (depicted generally at 22) to manage including, but not limited to, omni-directional and directional antennas, fixed or beam-steerable antennas. The antennas may be shared between communications links/radios, or with sensor systems. In the example illustrated in FIG. 1, the communications from the platform antennas 22 are directed at an end user 23, for example, the remote pilot of a UAV located at a ground station. However, communications are not necessarily intended to be in any way limited in this regard.

Thus, the Intelligent Communications Management System has access to a wealth of information, such as mission environment and internal state of the node, and uses this information in its decision making. The environment represents the systems knowledge about the outside world, including network and link performance, other nodes in the network environment, dynamic threats, terrain, obstacles and weather data. The internal state is a representation of the internals of the system. It collects internal data from contributing sub-systems, such as real-time node attitude and position, current operational mode and applications' communications requirements, and it retains communications/information exchange plans, policies and information about installed resources (e.g. communications links and its antennas).

A database (not shown) provides the intelligent communications management module 10 with knowledge about its mission environment and internal state, and uses this information in its decision making. The environmental data represents the system's knowledge about the outside world, including network and link performance, other nodes in the network environment, dynamic threats, terrain, obstacles and weather data. The internal state is a representation of the internal sub-systems of the system. The database collects internal data from contributing sub-systems, such as real-time node attitude and position, current operational mode and the communications requirements of individual applications, and it retains communications/information exchange plans, policies and information about installed resources (e.g. communications links and its antennas). For example, the antenna gain patterns for each installed antenna on a node would be stored on each node, in a database for example, to be used by the intelligent communications management module 10 in respect of, for example, antenna selection. In this example, the antenna gain patterns are mapped with respect to the body reference frame of the node, i.e. location of the antenna on the node.

It will be appreciated that the term "database" used above, is used simply to define one or more repositories for the required data. In one exemplary embodiment, the database may be a single repository, provided on the intelligent management module 10 (or at least dedicated thereto) in which all of the aforementioned data is stored for use thereby. In other exemplary embodiments, such a single repository may be used to store only a sub-set of the data, such as policies and installed antenna performance, to be accessed as required, with data that changes dynamically during a flight or mission, such as node position and operational mode, being sent directly from a relevant part of the overall platform management system to the intelligent communications management module.

Also illustrated in FIG. 1, are data inputs representative of constraints 24, platform demands, and policy 28. These factors and the manner in which data representative thereof can be obtained will be known to a person skilled in the art. The policy 28, for example, may be designed by the network designer. A copy of this policy may reside within the intelligent management module 10, or accessible thereby. The policy contains a set of rules that, for example, define how communications links and antennas can be used, what action to take in the event of a hardware fault and/or loss of signal, and how avionics applications can be served to support the mission. Such rules may be expressed as condition-action pairs (i.e. IF condition THEN action) and/or in look-up tables.

Figure 2:
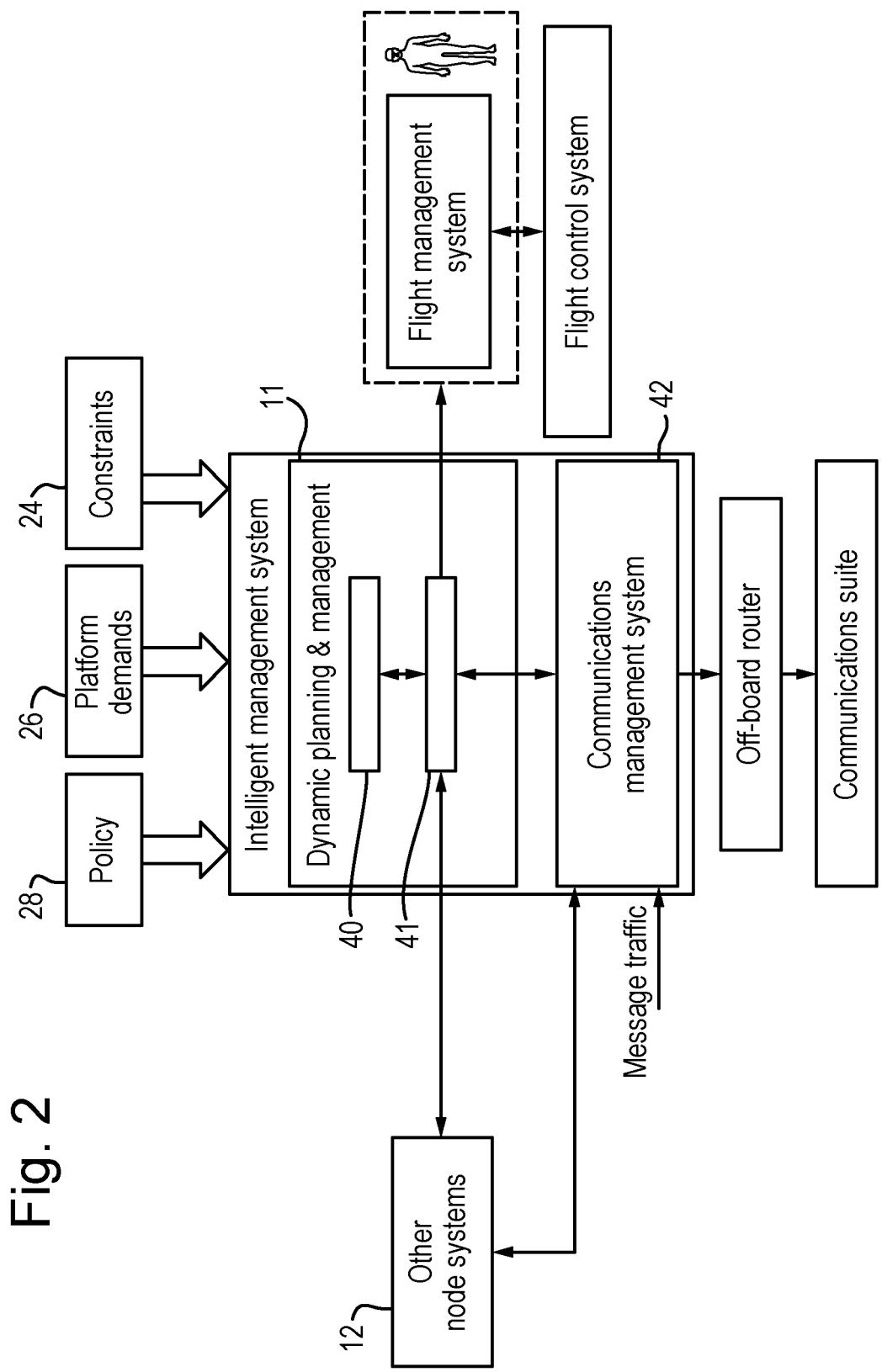
FIG. 2 is a schematic block diagram illustrating some principal features of the moving platform system of FIG. 1 in more detail.
Figure 3A:
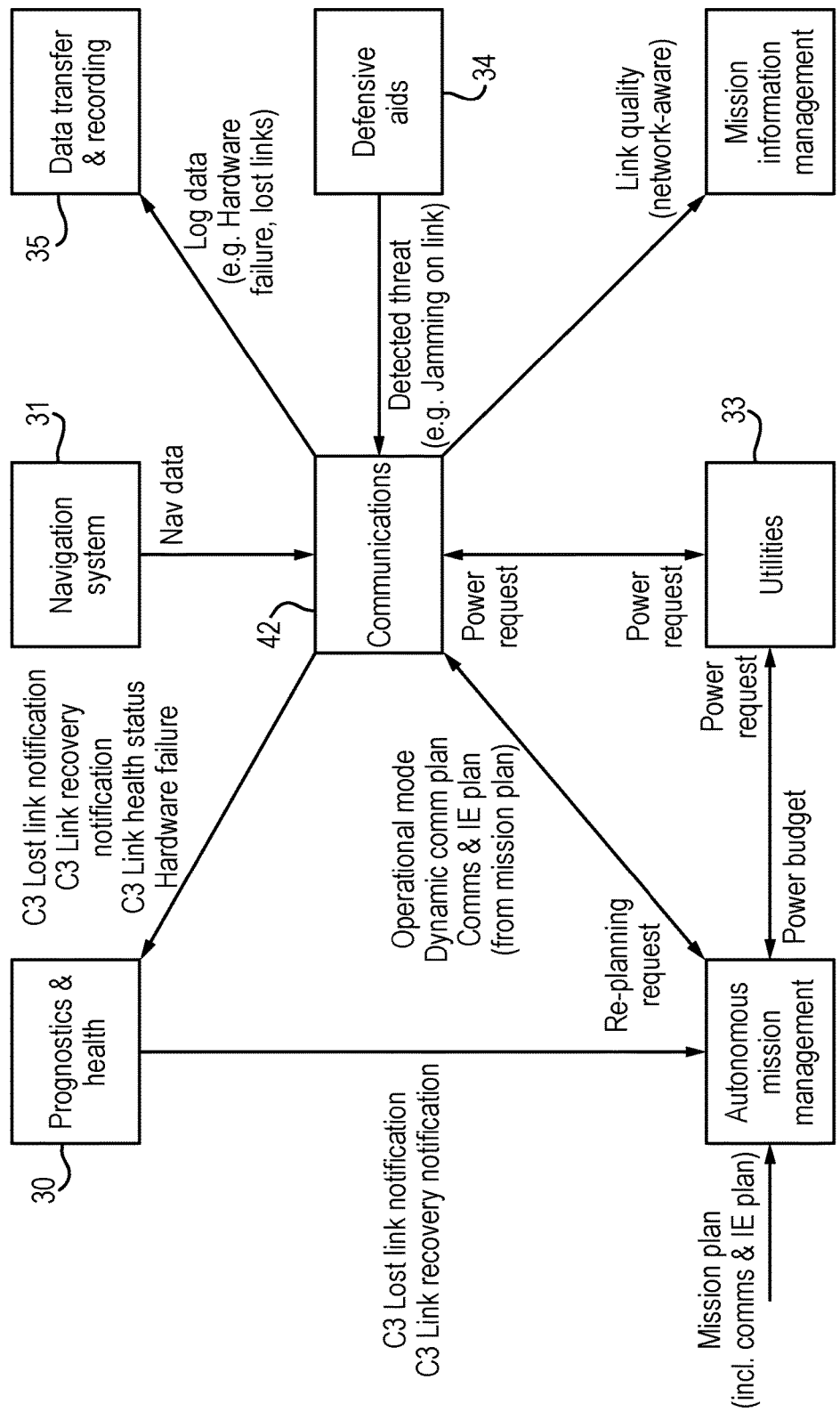
FIG. 3A is a schematic block diagram illustrating the data connections of an intelligent communication management system, including apparatus according to an exemplary embodiment of the present invention, in an air-based system.
Figure 3B:
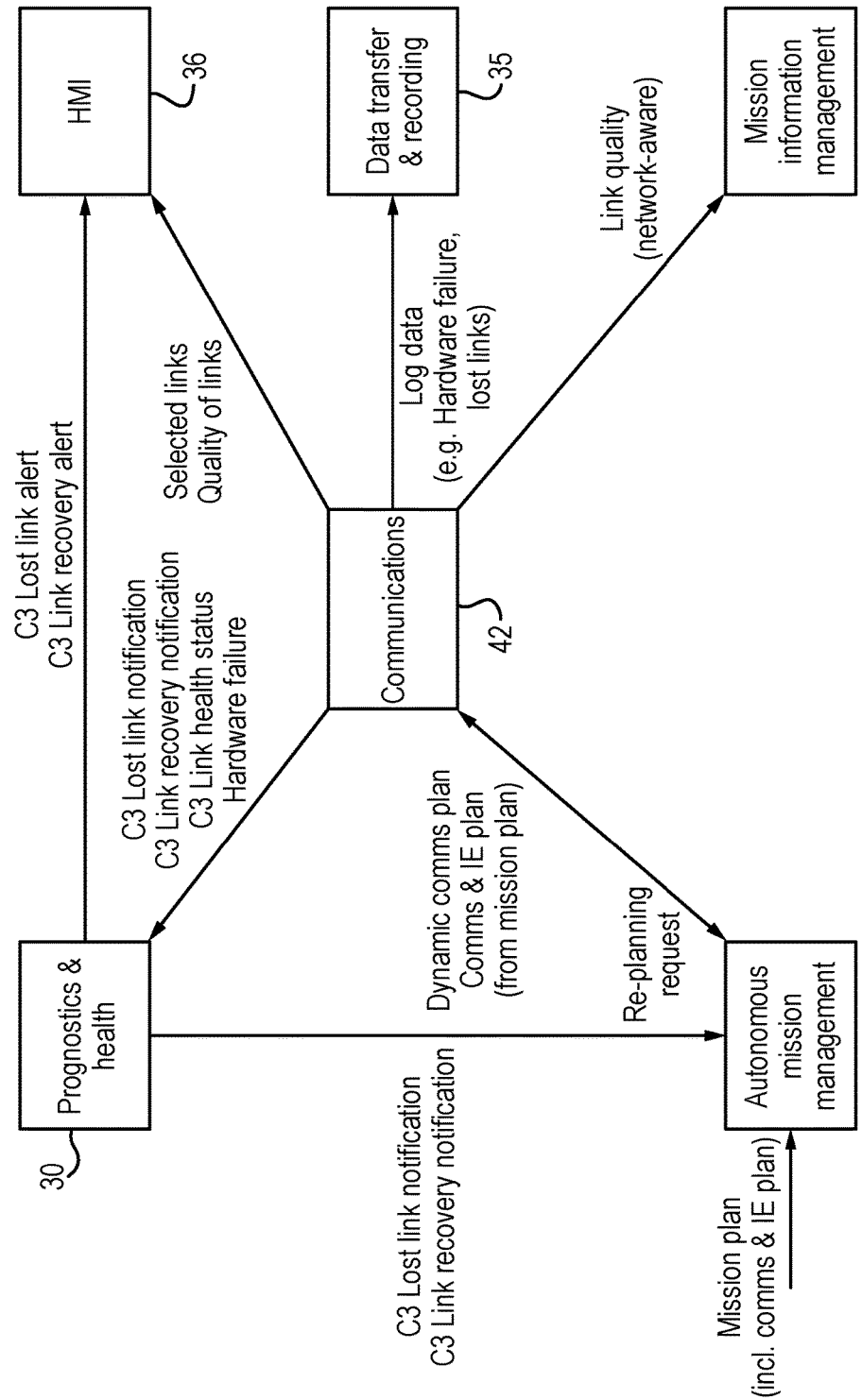
FIG. 3B is a schematic block diagram illustrating the data connections of an intelligent communication management system, including apparatus according to an exemplary embodiment of the present invention, in a ground-based system/airborne control station.

Thus, the Intelligent Communications Management System can be divided into two distinct parts with inputs and outputs to each other and other parts of the aircraft or ground-based system, as shown in FIG. 2. These two distinct parts may reside in different parts of the aircraft or ground-based system, as shown in FIGS. 3A and 3B, for example the dynamic planning and management may reside in mission management subsystem/system, whilst the communications management within the communications subsystem/system. Such an implementation is more applicable to Unmanned Air Systems (UAS). In another implementation, the above may reside in one box; this implementation may be appropriate for manned systems, such as a manned air vehicle.

Referring now to FIG. 2 of the drawings, the intelligent management module 10 comprises a dynamic planning and management module 11 and a communications management system 42. The communications management system 42 is concerned with low-level decision making. It manages the communications links and antennas, and works in concert with avionics applications to adapt to the prevailing network conditions. For example, it is concerned with dynamically steering messages, sent by the transmitting avionics application, via the most appropriate communications link, as well as antenna, in the most expedient fashion, in terms of latency, bandwidth, security and cost, whilst considering the communications requirements of the applications, current network performance, communications resource availability and preferences of the system designer and platform. When it is unable to resolve certain communications issues, it is configured to generate a request for the dynamic planning and management module 11 to modify plans in order to meet platform demands (i.e. higher-level planning).

In the example shown, the dynamic planning and management module 11 comprises a dynamic planner 40 and a manager 41, that provides an interface between the dynamic planner 40 and the communications management system 42, as will be described in more detail below.

In exemplary embodiments of the present invention (and as illustrated in FIGS. 2, 3A and 3B of the drawings), the intelligent communications management system 10 works cooperatively with the rest of the platform's systems/subsystems to achieve the mission goal: to provide information for situational awareness and safety purposes, and to receive information used in its decision making. In other words, at least parts of the node system 12 are communicably coupled to the communications management system 42 and the dynamic planning and management module 11. FIGS. 3A and 3B depict schematically this interaction for air-based systems and ground-based systems/airborne control station respectively. As explained above, the node system 12 may comprise one or more of a prognostics and health system 30, a navigation system 31, a control authority 32, e.g. pilot node, a utilities management system 33, defensive aids system 34, data transfer and recording 35 system, and an HMI (Human Machine Interface) 36. As an example, the health function within the UAV Communications system provides C2 health status updates to the node's Prognostics and Health system. If a C2 Lost Link is detected by the Communications system's health function, it will send a C2 Lost Link alert message to Prognostics and Health system, for it to take the appropriate action; for a UAV, the Prognostics and Health system notifies Mission Management or Airspace Integration system of the C2 Lost Link, while for a UCS, it reports the C2 Lost Link to the HMI (intended for the pilot).

The intelligent communications management system 10 receives a large quantity of information from different parts of the platform, which it can use in its decision-making processes, as described in more detail below. It is consequently mission-, motion-, and network-aware and understands what resources it has to manage, as well as their performance capability. Mission-awareness provides information on what the platform is trying to achieve.

There can be various operational modes, that might include normal operation, reconnaissance, under attack, attack, taxiing, landing, etc. This is common to the entire platform and is of particular concern to the communications module 42. The communications module 42 monitors and evaluates current network performance, so it is network-aware. Network awareness information may also be shared with the dynamic planning and management 11 for planning purposes. Motion-awareness enables communications module 42 to intelligently route information along the best path to ensure connectivity to a fixed and/or mobile node is maintained, for example, in response to an unexpected and possibly a sharp manoeuvre. The dynamic planning and management 11 is also motion-aware, in that it may receive a priori future route and/or manoeuvre plan in order to assess its impact on communications and to select suitable communications link(s), including antennas. The dynamic planning and management 11 is aware of other platform demands, such as emission demands. It is thus, mission-, network-, motion- and platform-aware, enabling the intelligent communications management system 10 to dynamically adapt and respond to unexpected events, e.g. change in mission priorities, mission environment and network conditions.

Referring back to FIG. 2 of the drawings, dynamic planners are also widely known and used in many different applications. A dynamic planner is typically provided in respect of, for example, a UAV for planning its route/path, from a start point (typically, but not always) to a defined end point (and optionally including any defined waypoints therebetween), as well as planning its manoeuvre and/or trajectory, and communications strategies throughout the route. Known dynamic planners (path, manoeuvre and trajectory) tend to base their calculation on several factors, such as terrain, threat, weather, and platform constraints, etc. For example, a manoeuvre may be calculated to avoid an airborne obstacle or a path calculated to avoid detection of the UAV.

Other types of dynamic planners for route planning in many different applications will be known to a person skilled in the art and the present invention is not necessarily intended to be limited in this regard.

However, in prior art systems, the impact on communications is not taken into account during dynamic path and/or manoeuvre planning. In addition, the need to perform dynamic planning to benefit communications, when there has been a loss of communication or severe degradation or to avoid detection, for example, has not been considered.

In contrast, in this exemplary embodiment of the present invention, the management function 41 of the dynamic planning and management module 11 interfaces with the dynamic planner 40, the communications management system 42 (for example, via a communications executive, as will be described in more detail below) and other parts of the node system 12, as illustrated schematically in FIG. 4A of the drawings. The management function 41 is responsible for generating plan requests and providing attributes to the dynamic planner 40, evaluating new plans, selecting the best plan, requesting authorisation from the platform/pilot to execute the new plan (e.g. use a sensor system for communication purposes, manoeuvre a node), in order to optimise communications.

Figure 4:
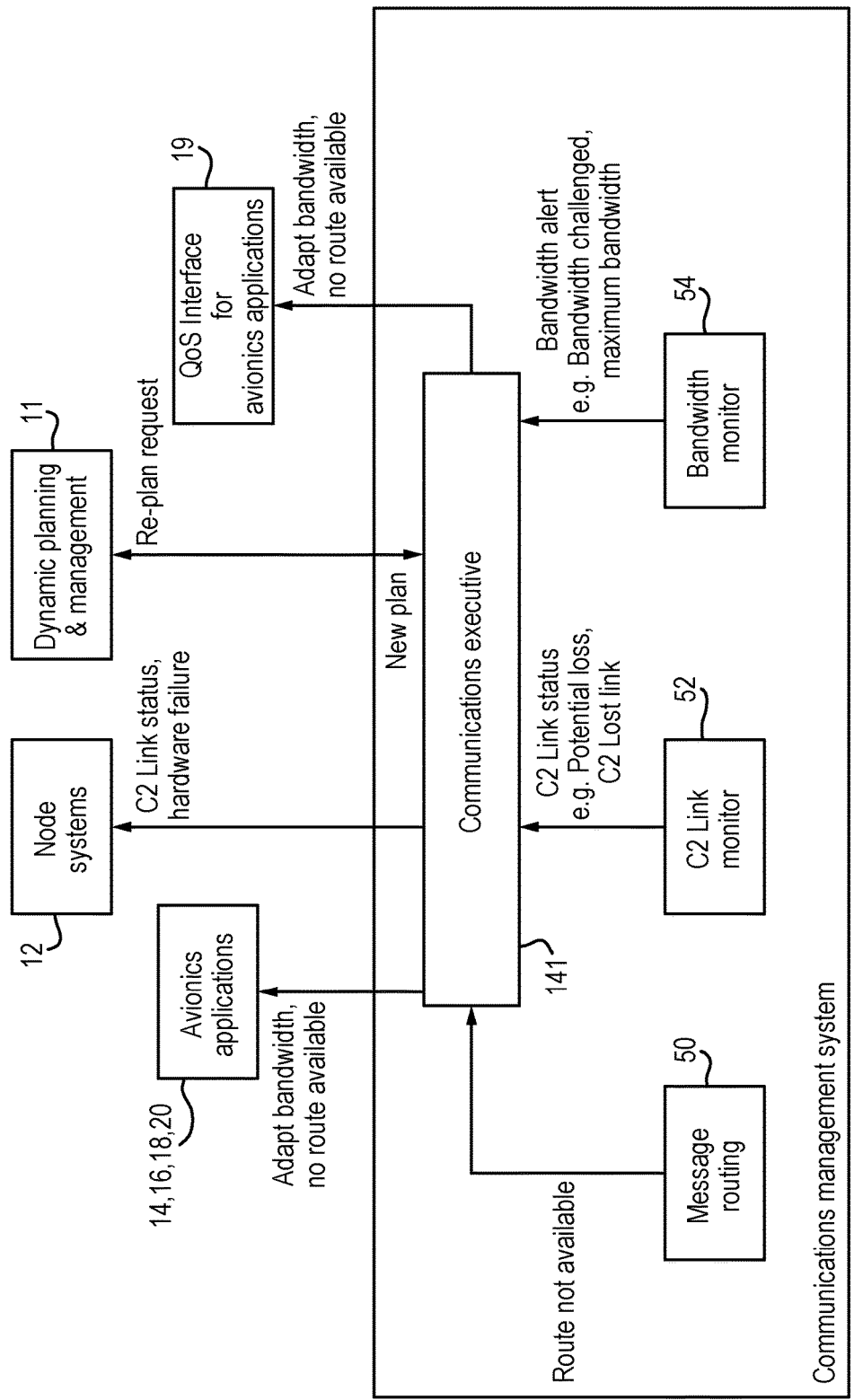
FIG. 4 is a schematic block diagram illustrating a communications executive function according to an exemplary embodiment of the present invention.

Referring to FIG. 4 of the drawings, in one exemplary embodiment of the invention, a Communications Executive function 141 is provided within the communications management system 42 to enable it to interface with components internal and external to the communications management system 42. Internal components of the communications management system 42 include a message routing module 50, a C2 (command and control) monitor 52 and a bandwidth monitor 54. The Communications Executive function 141 is configured to manage plan requests, receive new plans, work with avionics applications 14, 16, 18, 20 and/or a QoS interface 19 for avionics applications, receive health reports and report health issues that may have an impact on a mission. In general, if the communications management module 42 cannot adapt to meet current platform demands using integrated low-level planning functionality, then higher-level planning is invoked. If conditions improve during the planning phase or at some point after it, the higher plan will not be required and the relevant function is informed and/or the plan discarded.

For example, if the message routing function 50 cannot meet current platform/mission demands, higher-level planning may be invoked. The message routing function informs the Communications Executive function 141, which is configured to send a re-plan request to the management function 41 within the dynamic planning and management module 11. The management function 41 generates a plan request to the dynamic planner in order to generate a plan. The plan request may be, for example, a request to select a suitable communications link and/or suitable antenna (and/or beam) and/or optimal off-board transmission power. Additional information may be provided with the plan request to the dynamic planner by the management function, in order to generate a plan. The dynamic planner then generates a plan to best meet the current mission objectives, using the same strategies available to it during pre-mission communications planning, based on its mission goal and its understanding of its mission environment, real-time link performance, installed communication links and antennas (includes type, location on node, pointing and performance), position of other nodes in the vicinity and constraints, any current EMCON restrictions, etc. The new plan is then sent to the Communications Executive function 141 for implementation. In the meantime, the message routing function 50 continues to search for suitable communications routes for its messages. If conditions improve, for example, during the planning phase or at some point after it, the re-plan will not be required and the relevant function is informed and/or the re-plan is discarded. In this case, the Communications Executive function 141 is informed that a re-plan is no longer required by the message routing unit 50 and the Communications Executive 141 relays this information on to a designated function, such as the management function 41 within the dynamic planning and management module 11. In another example, the Communications Executive function 141 interfaces with avionics applications 14, 16, 18, 20 and/or the QoS interface 19, so that they adapt to prevailing network conditions causing them to adapt their information and, for example, store and/or drop their (unsent) messages when a route cannot be found.

Thus, upon receiving a plan request from the Communications Management unit 42, the Management function 41 will request a new plan from the dynamic planner 40. It will then receive the dynamically generated plan and associated plan metric. The Management function will use the estimated plan metric to evaluate the "goodness" of the plan against policy (i.e. plan selection rules) and subsequently select or reject the plan. For example, policy may prescribe that a plan with a plan metric less than and equal to 4 may be discarded and to select a plan that has a plan metric greater than and equal to 5. If it is deemed an unacceptable plan, the Management function 41 will seek an alternative plan. If the plan is deemed acceptable, the Management function 41 will provide the Communications Management 42 unit with the new plan.

In some cases, prior to forwarding the plan onto the Communications Management unit 42, the Management function 41 may require authorisation from a designated authority to endorse the plan. The plan and associated plan metric (which in this context represents the benefit to the overall mission) will be sent for authorisation. The Management function 41 will be informed if the plan is accepted or rejected by the designated authority e.g. mission management on node or pilot. For example, a request to use a sensor for communications may be rejected because the node's current sensor plan has higher priority and will provide greater benefit to the mission than if used for communications. If the plan is rejected by the designated authority, the Management function 41 will seek to find the next best plan and propose that as alternative. If the plan is accepted, the Management function 41 will provide the Communications Management unit 42 with the new plan.

The process is slightly different for a node manoeuvre plan, wherein the dynamic planner 40, upon receiving a re-plan request from the management function, generates a node manoeuvre plan to mitigate or circumvent a communications failure, to improve communications, or to avoid detection. Upon receiving a manoeuvre plan (i.e. best achievable/optimal orientation and/or position) from the dynamic planner 40, the Management function 41 will request the node's dynamic route planner to devise a route plan to achieve that desired attitude and location. In this case, the dynamically generated route plan and the associated plan metric will be put forward to the designated authority, e.g. the decision maker common to the platform or pilot, for approval. If accepted, the decision maker will be responsible for instructing the node's vehicle management system to carry out the manoeuvre or fly a different route.

As explained above, the Dynamic Planning function 40 generates new plans upon request from the management function 41. It will dynamically generate a plan (in real or near real time) to best meet the current mission objectives, based on its mission goal and its understanding of its mission environment, real-time link performance, installed communication links and antennas (includes type, location on node, pointing and performance), position of other nodes in the vicinity and constraints.

Figure 4A:
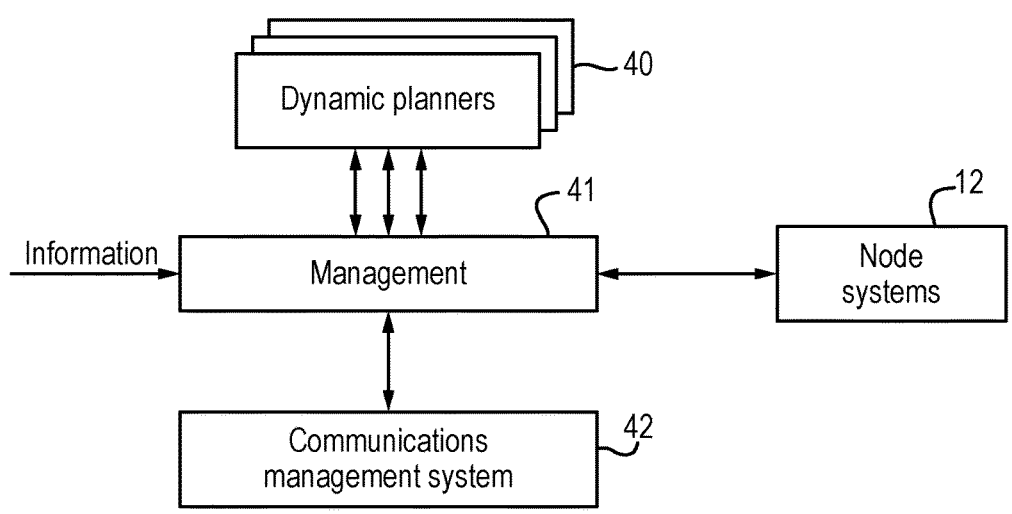
FIG. 4A is a schematic diagram illustrating the interactivity between the dynamic planning and management function and an intelligent communications management system including apparatus according to an exemplary embodiment of the present invention.

Dynamic Planning may consist of multiple planners generating various plans (as illustrated in FIG. 4A). The planner can generate a node manoeuvre plan to optimise communications, Link Selection plan and Antenna Selection plan and an off-board transmission power plan to optimise communications, without violating constraints. The aforementioned are not mutually exclusive plans; two or more of these plans may be required to achieve a mission objective. For example, a node manoeuvre and antenna selection may both be required to achieve the same mission objective.

The planner will calculate a Plan Metric associated with each new plan. A Plan Metric is a measure that quantifies the expected results of executing a plan. The Plan Metric may be expressed in terms of benefit, cost or a combination thereof. Benefit is a measure of how good the new plan is for communicating information over the network. Cost is a measure of the cost of a course of action in terms of the power required, time required etc. to implement the plan. The planner may need to provide an estimation of the expected time required for a plan to be executed e.g. 5 minutes required for use the of RADAR's link; this could be of use for the decision maker when authorising the plan. As an example, the Plan Metric might be defined as Plan Metric=Benefit Metric, or Plan Metric=(Benefit Metric/Cost Metric). The planning function will send the new plan and associated plan metric to the Management function. Plan metric values may be integer values in the range between 1 and 10, in which an ideal plan has a plan metric value equal to 10.

Figure 5:
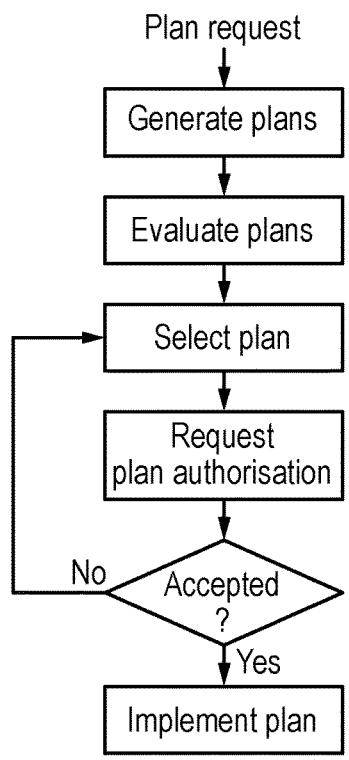
FIG. 5 is a schematic flow diagram illustrating a first exemplary embodiment of a dynamic planning and management function for use in the moving platform system of FIG. 1.

In the following, two exemplary embodiments of the implementation of the Dynamic Planning and Management Unit 11 are described in more detail. In one embodiment, as illustrated schematically in FIG. 5, the Management function 41 may request all planners to generate a plan. Once it receives the plans from the multiple planners and associated Plan Metrics, the Management function 41 will determine the best plan to achieve the platforms demands, as per policy. The Management function 41 may send an authorisation request, the selected best plan and associated Plan Metric to the designated authority for approval. If the plan is rejected, then the plan with the next highest metric is selected for authorisation.

Figure 6:
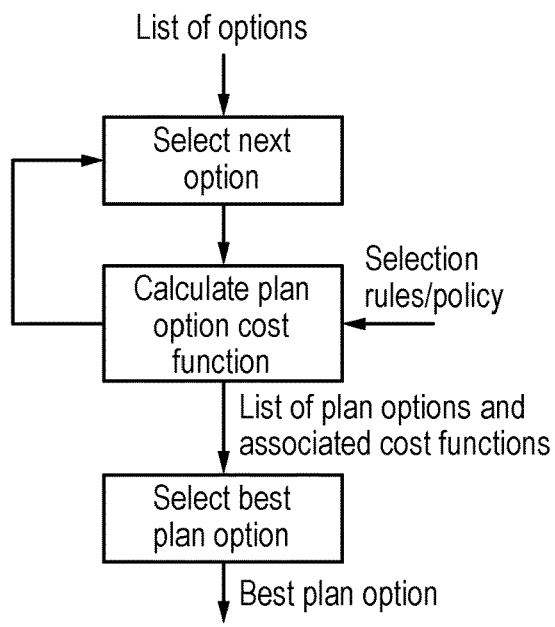
FIG. 6 is a schematic flow diagram illustrating a second exemplary embodiment of a dynamic planning and management function for use in the moving platform system of FIG. 1.

In another exemplary embodiment, partially illustrated schematically in FIG. 6 of the drawings, upon receiving a plan request from the Communications Unit 42, the Management function 41 will need to identify the most suitable plan to meet the platforms demands, e.g. a link selection, antenna selection or node manoeuvre plan. A metric for each of the planning options will be calculated by the Management using selection rules/policy and current performance information. The metric can be determined by considering, for example, the user/node preferences and availability of resources. Each plan option may have a preference number against it, which represents the preferred plan option for that mission, such as a primary, secondary, tertiary etc. preference. The preferences may be implemented in a look-up table by the system designer. The plan option with the highest metric will be selected by the Management function and the selected planner (i.e. associated with the highest metric) will be requested to devise a plan.

Once the Management function 41 receives the plan and associated Plan Metrics, the Management function 41 will use the estimated plan metric to evaluate the "goodness" of the plan against policy (i.e. plan selection rules) and subsequently select or reject the plan. If the plan is determined to be unacceptable, then the Management function will select the plan option with the next highest metric (i.e. next best) and request a plan from another planner. If the plan is deemed to be acceptable, the Management function 41, in some cases, may require authorisation to endorse the plan. The request for authorisation will be raised along with the plan and associated plan metric, which represents the benefit to the overall mission.

The Management function 41 will be informed if the plan is accepted or rejected by the designated authority. If the plan is rejected, the Management function 41 will select the plan with the next highest metric and request a plan from the associated planner. If the plan is accepted, the Management function 41 will provide the Communications Management unit 42 with the new plan.

It will be apparent to a person skilled in the art, from the foregoing description, that modifications and variations can be made to the described embodiments without departing from the scope of the present invention as defined by the appended claims.

What is claimed is:

1. Apparatus for communications management in respect of a moving platform having:
   a dynamic planner configured to generate a communications plan utilising one or more of a plurality of communications planning strategies;
   at least one platform application; and
   a communications system configured to effect wireless data communication of data received from a platform application by means of one or more supported communications links in accordance with said communications plan;
   wherein said apparatus comprises:
   an interface function between said dynamic planner and said communications system, said interface function including:
   a communications executive module; and
   a communications management module;
   said communications executive module being configured to receive, from said communications system, condition data representative of a prevailing situational and/or environmental condition affecting a current communications plan during mission execution, generate re-plan request data and transmit said re-plan request data to said communications management module;
   said communications management module being configured to generate plan request data in response to said re-plan request data and transmit said plan request data to said dynamic planner, said plan request data being configured to cause said dynamic planner to generate a revised communications plan and transmit said revised communications plan to said communications system;
   wherein said plan request data is generated by said communications management module by selecting a strategy from said plurality of communications planning strategies, based at least on said condition data, and generating said plan request data including data representative of said selected strategy; and
   wherein said communications management module is configured to transmit said plan request data to an authorisation module for assessment and, in response to a positive assessment of said plan request data, the communications management module is configured to transmit a re-plan request to said dynamic planner.

2. The apparatus according to claim 1, wherein said communications planning strategies include two or more of platform manoeuvre, antenna and/or link selection, power transmission selection and/or antenna beam selection.

3. The apparatus according to claim 1, wherein said communications management module is configured to include, in said plan request data, said condition data, or data representative thereof, for use by said dynamic planner in generating said revised communications plan.

4. The apparatus according to claim 1, wherein said condition data includes data representative of a platform manoeuvre that may affect a current or future communications link, and wherein said apparatus is configured to transmit said condition data, or data representative thereof, to said dynamic planner for use thereby in generating said revised communications plan.

5. The apparatus according to claim 1, wherein said condition data comprises data representative of a change of emissions control conditions in respect of said moving platform and/or an adversary node, and wherein said communications management module is configured to transmit said condition data to said dynamic planner for use thereby in generating a revised communications plan.

6. The apparatus according claim 1, wherein said condition data comprises data representative of detected interference and/or jamming in respect of a communications link for said moving platform, the communications management module being configured to transmit said condition data to said dynamic planner for use thereby in generating a revised communications plan.

7. The apparatus according to claim 1, wherein said condition data comprises data indicative that a current wireless communications link has failed or a quality of a communications link has changed, wherein said communications management module is configured, in response thereto, to generate said plan request data, the apparatus being further configured to transmit said plan request data to said dynamic planner to cause said dynamic planner to generate a revised communications plan.

8. The apparatus according to claim 1, wherein said condition data comprises data representative of a current operational mode of said moving platform.

9. The apparatus according to claim 1, wherein said dynamic planner is configured to transmit said revised communications plan to said communications management module, and said communications management module is configured to transmit said revised communications plan, or data representative thereof, to said communications system.

10. A management system for a moving platform comprising:
at least one platform application, the management system comprising:
a dynamic planner configured to generate a communications plan incorporating one or more of a plurality of communications planning strategies;
a communications system configured to effect wireless data communication of data received from a platform application by means of one or more supported communications links in accordance with said communications plan; and
an interface function between said dynamic planner and said communications system, said interface function including:
a communications executive module; and
a communications management module;
said communications executive module being configured to receive, from said communications system, condition data representative of a prevailing situational and/or environmental condition affecting a current communications plan during mission execution, generate re-plan request data and transmit said re-plan request data to said communications management module;
said communications management module being configured to generate plan request data in response to said re-plan request data and transmit said plan request data to said dynamic planner, said plan request data being configured to cause said dynamic planner to generate a revised communications plan and transmit said revised communications plan to said communications system;
wherein said plan request data is generated by said communications management module by selecting a strategy from said plurality of communications planning strategies, based at least on said condition data, and generating said plan request data including data representative of said selected strategy; and
wherein said communications management module is configured to transmit said plan request data to an authorisation module for assessment and, in response to a positive assessment of said plan request data, the communications management module is configured to transmit a re-plan request to said dynamic planner.

11. The system according to claim 10, wherein said communications executive module is configured to receive further condition data from other systems and/or functions of said moving platform and transmit said further condition data to said dynamic planner in generating said revised communications plan.

12. The system according to claim 10, wherein said communications planning strategies include a revised route plan and/or obstacle avoidance/manoeuvre plan.

13. The system according to claim 10, wherein said strategies include an antenna, link and/or off-board transmission power plan, designed to maintain optimal communications in respect of said one or more communications links.

14. A method for communications management in respect of a moving platform having a dynamic planner configured for:
generating a communications plan incorporating one or more of a plurality of communications strategies;
at least one platform application; and
a communications system configured for:
effecting wireless data communication of data received from a platform application by means of one or more supported communications links in accordance with said communications plan;
wherein said method comprises:
configuring and employing an interface function between said dynamic planner and said communications system;
said interface function including a communications executive module; and
a communications management module;
said communications executive module being configured for:
receiving, from said communications system, condition data representative of a prevailing situational and/or environmental condition affecting a current communications plan during mission executions;
generating re-plan request data and transmit said re-plan request data to said communications management module;
said communications management module being configured for:
generating plan request data in response to said re-plan request data; and
transmitting said plan request data to said dynamic planner;
said plan request data being configured to:
causing said dynamic planner to generate a revised communications plan; and
transmitting said revised communications plan to said communications system;
wherein said plan request data is generated by said communications management module by selecting a strategy from said plurality of communications planning strategies, based at least on said condition data, and generating said plan request data including data representative of said selected strategy; and
wherein said communications management module is configured to transmit said plan request data to an authorisation module for assessment and, in response to a positive assessment of said plan request data, the communications management module is configured to transmit a re-plan request to said dynamic planner.

\* \* \* \* \*